(12) United States Patent
Brick et al.

(10) Patent No.: US 9,176,268 B2
(45) Date of Patent: Nov. 3, 2015

(54) SURFACE LIGHT SOURCE

(75) Inventors: Peter Brick, Regensburg (DE); Joachim Frank, Coburg (DE); Uli Hiller, Bad Abbach (DE); Stephan Kaiser, Regensburg (DE); Gerhard Kuhn, Koefering (DE); Ales Markytan, Regensburg (DE); Julius Muschaweck, Gauting (DE); Christian Neugirg, Regensburg (DE)

(73) Assignee: OSRAM OPTO SEMICONDUCTORS GMBH, Regensburg (DE)

( * ) Notice: Subject to any disclaimer, the term of this patent is extended or adjusted under 35 U.S.C. 154(b) by 276 days.

(21) Appl. No.: 13/639,859

(22) PCT Filed: Apr. 4, 2011

(86) PCT No.: PCT/EP2011/055203
§ 371 (c)(1),
(2), (4) Date: Jan. 8, 2013

(87) PCT Pub. No.: WO2011/131476
PCT Pub. Date: Oct. 27, 2011

(65) Prior Publication Data
US 2013/0100696 A1 Apr. 25, 2013

(30) Foreign Application Priority Data

Apr. 23, 2010 (DE) .................. 10 2010 018 030

(51) Int. Cl.
| F21V 5/00 | (2015.01) |
| F21V 7/04 | (2006.01) |
| F21V 8/00 | (2006.01) |
| F21K 99/00 | (2010.01) |
| F21V 11/14 | (2006.01) |
| G09F 13/04 | (2006.01) |

(52) U.S. Cl.
CPC ............. *G02B 6/0001* (2013.01); *F21K 9/00* (2013.01); *F21V 11/14* (2013.01); *G02B 6/0036* (2013.01); *G02B 6/0058* (2013.01); *G09F 13/04* (2013.01); *G02B 6/0073* (2013.01)

(58) Field of Classification Search
CPC ............. G02B 6/00016; G02B 6/0021; G02B 6/0036; G02B 6/0038; G02B 6/004; G02B 6/0043; G02B 6/0058; G02B 6/0073
USPC ......... 362/603, 606, 617, 619, 326, 329, 330; 257/84, 98, 99
See application file for complete search history.

(56) References Cited

U.S. PATENT DOCUMENTS

| 5,130,531 A * | 7/1992 | Ito et al. ...................... 250/216 |
| 6,667,576 B1 | 12/2003 | Westhoff |
| 6,880,948 B2 * | 4/2005 | Koch et al. .................... 362/600 |

(Continued)

FOREIGN PATENT DOCUMENTS

| DE | 0 86 06 421 U1 | 5/1986 |
| DE | 199 25 784 A1 | 12/2000 |

(Continued)

*Primary Examiner* — Jong-Suk (James) Lee
*Assistant Examiner* — Alexander Garlen
(74) *Attorney, Agent, or Firm* — Slater & Matsil, L.L.P.

(57) ABSTRACT

The invention relates to a surface light source with a lighting surface that includes at least one semiconductor body that emits electromagnetic radiation from its front side during operation. Decoupling structures are suitable for producing a local variation of the light density on the lighting surface, so that the light density is increased in at least one illumination area with respect to a background area.

12 Claims, 3 Drawing Sheets

(56) References Cited

U.S. PATENT DOCUMENTS

| | | | |
|---|---|---|---|
| 6,987,613 B2* | 1/2006 | Pocius et al. | 359/565 |
| 7,161,188 B2* | 1/2007 | Orita | 257/98 |
| 7,270,454 B2* | 9/2007 | Amano | 362/522 |
| 7,303,338 B2* | 12/2007 | Lin et al. | 385/88 |
| 7,997,771 B2* | 8/2011 | Epstein et al. | 362/339 |
| 2003/0206408 A1 | 11/2003 | Funamoto et al. | |
| 2008/0042153 A1* | 2/2008 | Beeson et al. | 257/94 |
| 2009/0003002 A1 | 1/2009 | Sato | |
| 2009/0196071 A1* | 8/2009 | Matheson et al. | 362/623 |

FOREIGN PATENT DOCUMENTS

| | | |
|---|---|---|
| DE | 697 35 732 T2 | 9/2006 |
| DE | 20 2008 015 080 U1 | 1/2009 |
| DE | 10 2010 018 031 A1 | 10/2011 |
| JP | 08-241051 A | 9/1996 |
| WO | WO 2004/090586 A1 | 10/2004 |

* cited by examiner

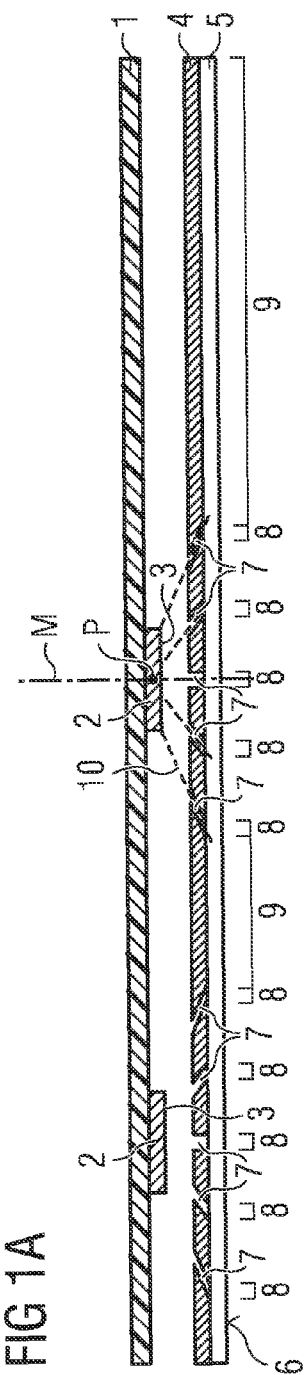
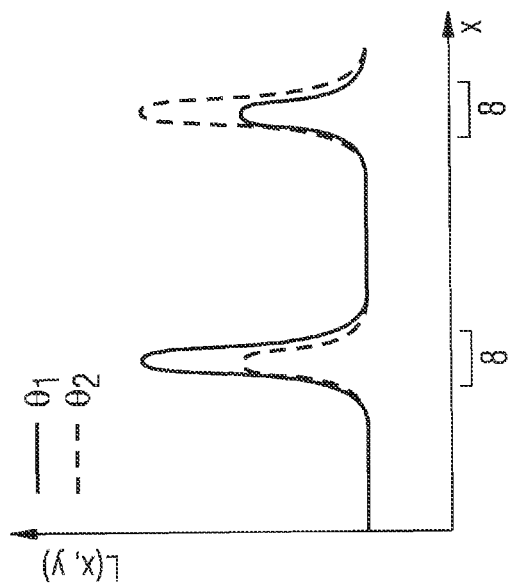
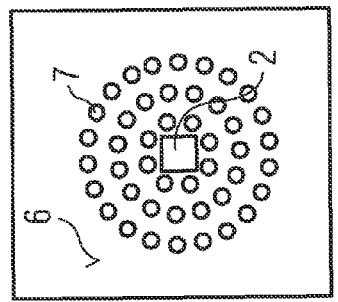

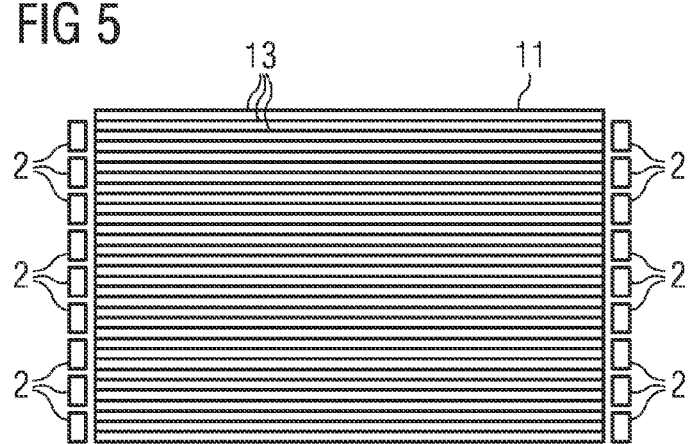
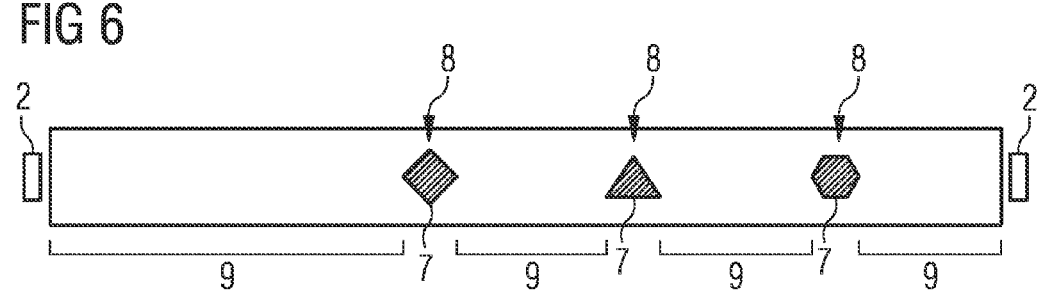
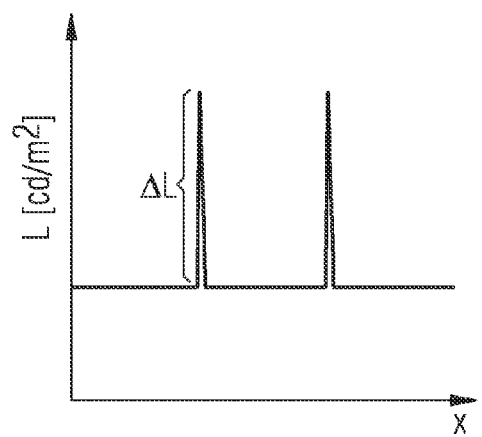

SURFACE LIGHT SOURCE

This patent application is a national phase filing under section 371 of PCT/EP2011/055203, filed Apr. 4, 2011, which claims the priority of German patent application 10 2010 018 030.0, filed Apr. 23, 2010, each of which is incorporated herein by reference in its entirety.

TECHNICAL FIELD

The present invention relates to a surface light source.

SUMMARY OF THE INVENTION

In one aspect, the present invention to provides a surface light source that is suitable for general illumination and has a glitter effect.

Such a surface light source comprises, in particular embodiments, at least one semiconductor body which emits electromagnetic radiation from its front side during operation. Output coupling structures are suitable for producing a local variation of the light density on a lighting surface of the surface light source, so that the light density is increased in at least one illumination region with respect to a background region.

The local variation of the light density on the lighting surface of the surface light source preferably produces a glitter effect for the human eye.

One idea is for the light emitted by the semiconductor body to be coupled out pointwise with the aid of the output coupling structures in such a way that the lighting surface comprises illumination regions in which the light density varies comparatively strongly locally as well as preferably as a function of the observation angle. To this end, the output coupling structures are expediently distributed asymmetrically along the lighting surface. Particularly preferably, the output coupling structures have a particularly high concentration in the illumination region while the concentration of the output coupling structures in the background region is fairly low.

Particularly preferably, the background region is not entirely dark but likewise has a light density, which is preferably formed as homogeneously as possible. Preferably, the background region has a light density which is greater than or equal to 10 cd/m². The ratio of a local maximum of the light density to a local minimum of the light density $L_{max}/L_{min}$ in the background region is preferably not greater than two.

According to one embodiment of the surface light source, further output coupling structures are provided in order to homogenize the emission characteristic inside the background region of the lighting surface.

According to one embodiment of the surface light source, the radiation-emitting front side of the semiconductor body is arranged parallel to the lighting surface of the surface light source. This embodiment is also referred to as "direct backlighting."

In the case of a surface light source with direct backlighting, according to one embodiment, a scattering plate is arranged between the radiation-emitting front side of the semiconductor body and the lighting surface, the output coupling structures being placed in the scattering plate. The purpose of the scattering plate is to homogenize light of the semiconductor body, which strikes the scattering plate, in the background region. In the regions in which the output coupling structures are placed in the scattering plate, on the other hand, light is coupled out to a greater extent so that at least one illumination region is formed. The output coupling structures in this case preferably have orders of magnitude in the range of the thickness of the scattering plate.

The output coupling structures may, for example, be formed by holes in the scattering plate. These are particularly preferably arranged in the region of the semiconductor body. For example, the holes are arranged over the radiation-emitting front side of the semiconductor body so that light, which is emitted by the semiconductor body, can pass directly through the holes to the observer. Preferably, the holes are arranged on concentric circles around the semiconductor body. Furthermore, the holes may also be distributed periodically or randomly over the scattering plate.

The holes in the scattering plate may for example be formed cylindrically, conically or frustoconically.

Furthermore, the holes are particularly preferably arranged in the scattering plate so that a rotation axis of the respective hole intersects the mid-axis of the semiconductor body. Particularly preferably, a plurality of holes are arranged in the scattering plate so that their rotation axes intersect at a point of the mid-axis. In this embodiment, the holes are arranged at various angles with respect to the mid-axis of the semiconductor body. In this way, a strong variation of the light density as a function of the observation angle can preferably be produced.

According to another embodiment of the surface light source with direct backlighting, the semiconductor body is embedded in a light guide, the output coupling structures being arranged on the side of the light guide facing the lighting surface, in the region of the radiation-emitting front side of the semiconductor body. In general, for manufacturing technology reasons, there is an air gap between the semiconductor body and the light guide. This is generally between 5 µm and 1000 µm wide, preferably between 5 µm and 100 µm wide, the limits respectively being included. Furthermore, the gap between the semiconductor body and the light guide may also be filled with an adhesive, a silicone material or an epoxide material.

In this case, the output coupling structures may, for example, be formed by one of the following elements: cylindrical recesses, pyramidal recesses, conical or frustoconical recesses, cylindrical holes, pyramidal holes, conical or frustoconical holes, roughening, imaging structures, for example Fresnel structures. The output coupling structures in this case preferably have orders of magnitude in the range of the thickness of the light guide.

If elements which have a rotation axis are used as output coupling structures in the surface light source, for example cylindrical, conical or frustoconical light or recesses, which are for example arranged in the light guide or the scattering plate, then the rotation axis of the elements is preferably arranged obliquely, that is to say at an angle not equal to 90°, with respect to the lighting surface of the surface light source. In this way, particularly in the case of a surface light source with direct backlighting, illumination regions whose light density varies strongly with the observation angle can be provided.

According to another embodiment of the surface light source, the semiconductor body is arranged laterally with respect to the lighting surface and couples into a light guide. This embodiment is also referred to as "indirect backlighting." In the case of a surface light source with indirect backlighting, the output coupling structures may for example be formed by scattering sites, for example diffuser particles, voids, air-filled particles, defects or scattering geometries, inside the light guide.

The output coupling structures may in this case, for example, be formed by linear regions with a high concentration of scattering sites, such as diffuser particles or voids, air-filled particles, defects or scattering geometries, in the light guide. These linear regions are particularly preferably slightly offset with respect to the principal ray axis of the semiconductor body, in order to increase the homogeneity of the emission characteristic of the surface light source in the background region.

Asymmetrical concentrations of diffuser particles inside the light guide may, for example, be produced by applying an electromagnetic field to the light guide, when particles having an electrical and/or magnetic dipole moment are used. One suitable material for such diffuser particles is, for example, barium strontium titanate.

Scattering geometries with a defined shape and size inside the light guide may, for example, be produced in the light guide by means of a laser. Such scattering geometries may be formed so that they are visible to an observer in the off state of the surface light source and thus constitute an additional design aspect.

Furthermore, in the case of a surface light source with indirect backlighting it is also possible for the output coupling structures to be formed by indentations in one of the main sides of the light guide. Preferably, the indentations in the main surface of the light guide facing the lighting surface.

Particularly preferably, the variation of the light density with the position is greater than or equal to 100 cd/m$^2$, particularly preferably greater than or equal to 1000 cd/m$^2$.

Particularly preferably, the relative variation of the light density with the position from the background region to the illumination region has a value of greater than or equal to a factor of 2, particularly preferably a value greater than or equal to a factor of 5.

Furthermore, the illumination region is particularly preferably greater than or equal to 300 µm. Particularly preferably, the illumination region is greater than or equal to 1 mm.

Particularly preferably, the variation of the light density in the surface light source takes place not only as a function of the position but also as a function of the observation angle.

Particularly preferably, the variation of the light density with the angle is greater than or equal to 100 cd/m$^2$, particularly preferably greater than or equal to 1000 cd/m$^2$.

Particularly preferably, the relative variation of the light density with the angle from the background region to the illumination region has a value of greater than or equal to a factor of 2, particularly preferably a value greater than or equal to a factor of 5.

Particularly preferably, the variation of the light intensity with the observation angle takes place over an angle of not greater than 10°, particularly preferably over an angle of not greater than 5°.

The surface light source may in this case comprise one or more semiconductor bodies. Features, which have been described merely in connection with one semiconductor body, for the sake of simplicity, may likewise be combined accordingly with a multiplicity of semiconductor bodies.

BRIEF DESCRIPTION OF THE DRAWINGS

Further advantageous embodiments and refinements of the invention may be found below in connection with the figures describing exemplary embodiments.

FIG. 1A shows a schematic sectional representation of a surface light source according to a first exemplary embodiment;

FIG. 1B shows a plan view of a detail of the lighting surface of the surface light source according to FIG. 1A;

FIG. 1C shows a schematic representation of the light density L of two neighboring illumination regions of the surface light source according to FIGS. 1A and 1B as a function of the position x for two different observation angles $\theta_1$ and $\theta_2$;

FIG. 5 shows a schematic plan view of a surface light source according to a further exemplary embodiment;

FIG. 6 shows a schematic sectional representation of a surface light source according to a further exemplary embodiment; and FIG. 7 shows a schematic representation of the light density L as a function of the position x on the lighting surface of a surface light source.

Figure 2:
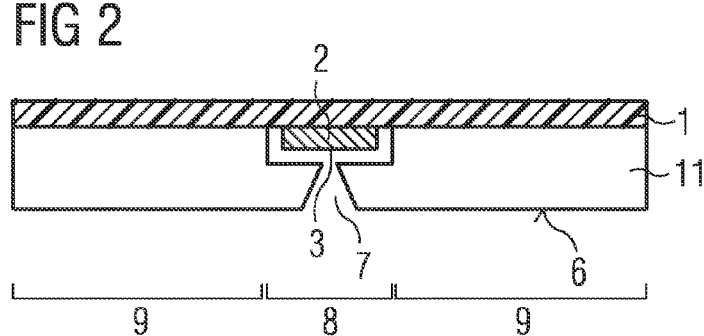
FIGS. 2 and 3 respectively show a schematic sectional representation of a surface light source according to two further exemplary embodiments.

In the exemplary embodiments and figures, components which are the same or have the same effect are respectively provided with the same references. The represented elements and their size ratios with one another are not to be regarded as true to scale. Rather, individual elements, in particular layer thicknesses, may be represented exaggeratedly large for better comprehension.

DETAILED DESCRIPTION OF ILLUSTRATIVE EMBODIMENTS

The surface light source according to the exemplary embodiment of FIG. 1A comprises a support 1 on which two semiconductor bodies 2 are applied, which emit electromagnetic radiation, preferably visible light, from their front sides 3 during operation of the surface light source. Arranged following the semiconductor body 2 in the emission direction, there is a scattering plate 4 on which a clear plate 5, for example made of glass or a transparent plastic, is applied as dust protection. In the present case, the front side of the clear plate 5 forms the lighting surface 6 of the surface light source.

In the surface light source according to FIG. 1A, the radiation-emitting front sides 3 of the two semiconductor bodies 2 are arranged parallel to the lighting surface 6 of the surface light source. The surface light source is therefore one with direct backlighting.

The scattering plate 4 comprises holes as output coupling structures 7 in the region of the semiconductor bodies 2. As can be seen in FIG. 1B, the holes in the scattering plate 4 are respectively arranged on concentric circles around the semiconductor body 2 in the scattering plate 4.

The holes here are cylindrically formed and introduced into the scattering plate 4 so that their rotation axes 10 lie on conic surfaces. The apices of the conic surfaces in turn lie at a common point P of the mid-axis M of the respective semiconductor body 2. In this way, a cone of rays, which is emitted by the semiconductor body, can pass pointwise through the holes in the scattering plate 4 and produce a local variation of the light density on the lighting surface 6.

In this exemplary embodiment, an illumination region 8 on the lighting surface 6 is therefore assigned to each cylindrical hole in the scattering plate 4. The remaining part of the lighting surface 6 forms the background region 9, in which no output coupling structures 7 are introduced in the present exemplary embodiment.

In the surface light source according to FIG. 1A, a lighting surface 6 having a multiplicity of illumination regions 8 is therefore formed, each illumination region 8 being assigned a principal emission direction which depends on the orientation of the hole inside the scattering plate 4. Since the orientations of the holes inside the scattering plate 4 are different, the principal emission directions of the illumination regions 8 are also different to one another. In this way, the glitter effect can be formed particularly strongly in the surface light source according to FIG. 1A, as will be described below with the aid of FIG. 1C.

FIG. 1C shows a schematic representation of the light density L of two neighboring illumination regions of the surface light source according to FIGS. 1A and 1B as a function of the position x for two different observation angles $\theta_1$ (solid line) and $\theta_2$ (dashed line). Since the principal emission directions of the illumination regions are different owing to the different arrangement of the holes inside the scattering plate 4, the maximum of the light density of the illumination regions 8 differs for the same observation angle. When the observation angle changes, for instance from $\theta_1$ to $\theta_2$, the maximum of the light density for the respective illumination regions 8 also changes.

Furthermore, it is also possible for the holes in the scattering plate 4 to be formed conically or frustoconically.

The scattering plate 4 of the surface light source of FIG. 1A is preferably thicker than 0.5 mm, particularly preferably thicker than 1 mm. Furthermore, a maximum thickness of the scattering plate 4 is preferably 20 mm, and particularly preferably 10 mm.

The diameter of the cylindrical holes lies in the range of the thickness of the scattering plate 4.

The surface light source according to the exemplary embodiment of FIG. 2 comprises a semiconductor body 2, which is applied on a support 1. The semiconductor body 2 is embedded in a light guide 11. The lighting surface 6 of the surface light source in this exemplary embodiment is formed by a main surface of the light guide 11. In the surface light source according to FIG. 2, the radiation-emitting front side 3 of the semiconductor body 2 is arranged parallel to the lighting surface 6. The exemplary embodiment of FIG. 2 is therefore also a surface light source with direct backlighting.

As an output coupling structure 7, the light guide 11 in the present case comprises a frustoconical hole which is arranged centrally over the radiation-emitting front side 3 of the semiconductor body 2. The frustoconical hole is used to couple radiation of the semiconductor body 2 pointwise out of the light guide 11 and thus produce an illumination region 8, which induces a glitter effect for a human observer, inside the lighting surface 6. In particular, a strong variation of the light density as a function of the observation angle can be achieved by virtue of the frustoconical shape of the hole.

Furthermore, between the semiconductor body 2 and the light guide 11, there is an air-filled gap which may also be filled with a transparent filler material, for example epoxy resin or silicone resin.

The light guide 11 preferably has a thickness of between 1 mm and 10 mm, the limits being included. The dimensions of the output coupling structures 7, for example the diameter of the frustoconical hole described above, preferably lies in the range of the thickness of the light guide 11, i.e., also between 1 mm and 10 mm, the limits being included.

Figure 3:
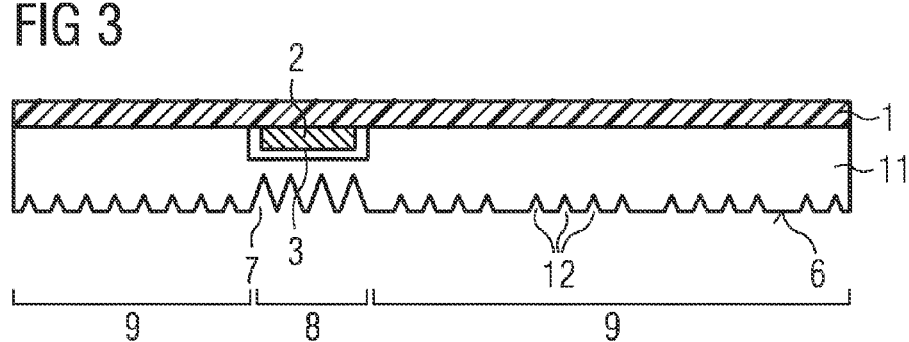

Like the surface light source of FIG. 2, the surface light source according to the exemplary embodiment of FIG. 3 also comprises a semiconductor body 2 which is applied on a support 1, the semiconductor body 2 being embedded in a light guide 11. Like the surface light source of FIG. 2, it is a surface light source with direct backlighting.

Over the radiation-emitting front side 3 of the semiconductor body 2, output coupling structures 7 which produce an illumination region 8 in the lighting surface 6 are introduced on the main surface of the light guide 11 facing the lighting surface 6. The output coupling structures 7 are formed by conical indentations in the light guide 11, the dimensions of which lie in the range of the thickness of the light guide 11. Laterally with respect to the semiconductor body 2 in the background region 9 of the lighting surface 6, further output coupling structures 12 are arranged in the main surface of the light guide 11 facing the lighting surface 6, these being provided in order to render the emission characteristic of the lighting surface 6 as homogeneously as possible in the background region 9. These further output coupling structures 12 arranged in the background region 9 of the lighting surface 6 are, for example, formed by recesses or roughening. In contrast to the output coupling structures 7 which are provided to create the illumination region, they have dimensions which preferably lie between 10 μm and 100 μm, the limits being included.

Figure 4A:
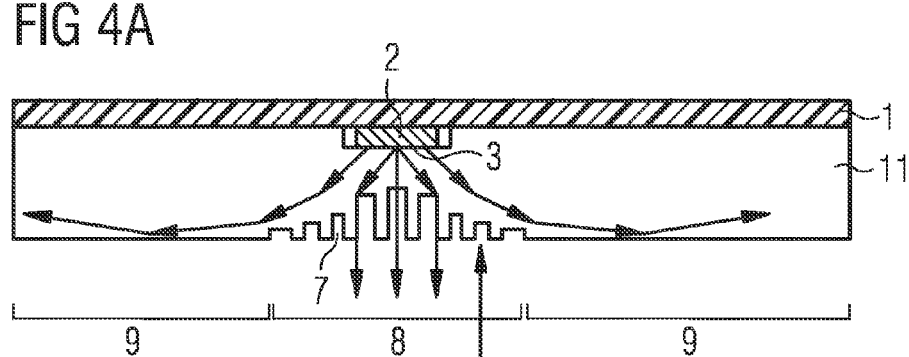
FIG. 4A shows a schematic sectional representation of a surface light source according to a fourth exemplary embodiment.

The surface light source according to FIG. 4A differs from the surface light source according to FIG. 2 with respect to the output coupling structures 7 in the side of the light guide 11 facing the lighting surface 6. As in the surface light source according to FIG. 2, the output coupling structures 7 are arranged over the radiation-emitting front side 3 of the semiconductor body 2 and are provided in order to produce an illumination region 8 in the lighting surface 6. The output coupling structures 7 are formed by cylindrical indentations in the main surface of the light guide 11, the depth of which respectively decreases symmetrically from the middle of the semiconductor body 2 in the direction of the sides.

As indicated by the arrow in FIG. 4A, the output coupling structures can couple light of the semiconductor body 2 pointwise out of the light guide 11 and simultaneously guide radiation, which is emitted laterally or at a shallow angle from the front side 3 of the semiconductor body 2, into the light guide 11 by total reflection. In this way, strong output coupling from the light guide 11 is produced pointwise in the region of the output coupling structures 7 and an illumination region 8 with a glitter effect is achieved in the lighting surface 6, while the light density of the background region 9 of the lighting surface 6 is homogenized.

Figure 4B:
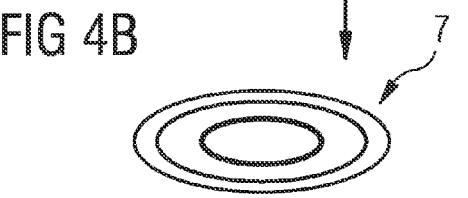
FIG. 4B shows a schematic perspective representation of the output coupling structures of the surface light source according to FIG. 4A.

FIG. 4B shows the output coupling structures 7 in the light guide 11 according to FIG. 4A in a schematic perspective manner. Here, it can be seen that the indentations in the light guide 11 are introduced into the main surface of the light guide 11 in continuous concentric circles around the semiconductor body 2.

The surface light source according to the exemplary embodiment of FIG. 5 comprises a light guide 11, a plurality of semiconductor bodies 2 which couple into the light guide 11 being arranged on each side of the light guide 11. The semiconductor bodies 2 in the present case are therefore arranged laterally with respect to the lighting surface 6, which is formed by a main surface of the light guide 11 in the surface light source of FIG. 5. The surface light source of FIG. 5 is therefore a surface light source with indirect backlighting.

The light guide 11 of the surface light source according to FIG. 5 comprises scattering sites as output coupling structures 7, which in the present case are formed by diffuser particles. The diffuser particles are introduced into the light guide 11 so that linear regions 13 with a high concentration of diffuser particles are formed. The diffuser particles increase the light output coupling from the light guide 11 and thus produce linear illumination regions 8 in the lighting surface 6, the linear illumination regions 8 generally having a greater width than the linear regions 13 comprising diffuser particles. If the width of the linear regions 13 comprising diffuser particles lies in the range of a few hundred μm, then the width of the linear illumination regions 8 lies in the range of a few mm. The spacing of the linear regions 13 comprising diffuser particles preferably lies in the range of the thickness of the light guide 11, that is to say between 1 mm and 10 mm.

The linear regions 13 comprising diffuser particles are respectively arranged slightly offset with respect to the principal emission axes of the semiconductor bodies 2. In this way, the homogeneity of the surface light source can advantageously be increased in the background region 9 of the lighting surface 6. A non-uniform diffuser particle concentration, for instance in linear regions 13, may for example be produced by means of diffuser particles which have a dipole moment. When such diffuser particles are used, an electromagnetic field is applied during the production of the light guide 11, so that the diffuser particles are arranged in a desired way inside the light guide 11.

Instead of diffuser particles for forming the output coupling structures 7, it is also possible to use thermally or optically produced voids or defects or air-filled particles in the light guide 11. Furthermore, slight impressions in one of the main surfaces of the light guide 11 may be used to form the output coupling structures 7, in which case the impressions are for example formed prismatically.

The surface light source according to FIG. 6 likewise has indirect backlighting. Scattering geometries are introduced into the light guide 11 of the surface light source of FIG. 6 as output coupling structures 7, one of which is formed cubically, one octahedrally and one pyramidally. The scattering geometries can be incorporated with a defined shape and size, for example, with the aid of laser structuring in a light guide 11 made of PMMA or glass. Such scattering geometries are preferably smaller than or equal to 1 mm, particularly preferably smaller than or equal to 100 μm.

As an alternative, it is also possible for the scattering geometries to be formed by separate particles in the light guide 11, the particles preferably having one of the geometries described above. These particles are preferably smaller than or equal to 30 μm.

The scattering geometries are suitable in for use as output coupling structures 7 and for coupling light pointwise out of the light guide 11 so that an illumination region 8 is formed during operation of the surface light source, the illumination region 8 having a light density which is increased with respect to a background region 9. These scattering geometries may be formed so that they are also visible in the off state and thus constitute a positive design aspect.

FIG. 7 schematically shows the light density 1 as a function of the position x on the lighting surface 6 of a surface light source, such as is represented for example in FIG. 1. Such a light density L is suitable for inducing a glitter effect for the human eye. In the regions of the semiconductor body 2, the light density L respectively has a local maximum, which is narrowly restricted locally. The width of the local maxima is preferably about 300 μm. These local maxima constitute the illumination regions 8 of the lighting surface 6. Outside the illumination regions 6, i.e., in the background region 9, the light density is preferably formed as homogeneously as possible. The light density L preferably has a value of at least 10 cd/m$^2$ in the background region 9. The local variation ΔL of the light density is preferably at least 100 cd/m$^2$, particularly preferably at least 1000 cd/m$^2$.

By the description with the aid of the exemplary embodiments, the invention is not restricted to the exemplary embodiments. Rather, the invention encompasses any new feature and any combination of features, which in particular comprises any combination of features in the patent claims, even if this feature or this combination is not itself indicated explicitly in the patent claims or exemplary embodiments.

The invention claimed is:

1. A surface light source with a lighting surface, the surface light source comprising:
   a semiconductor body that emits electromagnetic radiation from its front side during operation;
   wherein the radiation-emitting front side of the semiconductor body is arranged parallel to the lighting surface of the surface light source;
   wherein the semiconductor body is embedded in a light guide and output coupling structures are arranged on a side of the light guide facing the lighting surface in the region of the radiation-emitting front side of the semiconductor body;
   wherein the output coupling structures are one or more of cylindrical recesses, pyramidal recesses, conical or frustoconical recesses, cylindrical holes, pyramidal holes, conical or frustoconical holes, and have respective axes of rotation that extend obliquely with respect to the lighting surface, such that, during operation of the surface light source, a variation of a light density is a function of the observation angle and produces a glitter effect in an illumination region on the lighting surface for a human observer;
   wherein the output coupling structures are arranged centrally over the front side of the semiconductor body, said output coupling structures being configured to produce a local variation of light density on the lighting surface, so that the light density is increased in at least one illumination region with respect to a background region.

2. The surface light source according to claim 1, wherein the local variation of the light density is greater than or equal to 1000 cd/m$^2$.

3. The surface light source according to claim 1, wherein the illumination region has a dimension that is greater than or equal to 300 μm.

4. The surface light source according to claim 1, wherein the variation of the light density also takes place as a function of observation angle.

5. The surface light source according to claim 1, wherein the background region has a light density that is substantially homogeneous.

6. A surface light source with a lighting surface, the surface light source comprising:
   a semiconductor body that emits electromagnetic radiation from its front side during operation; and
   output coupling structures configured to produce a local variation of light density on the lighting surface, so that the light density is increased in at least one illumination region with respect to a background region;
   wherein the radiation-emitting front side of the semiconductor body is arranged parallel to the lighting surface of the surface light source;
   wherein the output coupling structures are holes in a scattering plate, and wherein, during operation of the surface light source, a cone of rays emitted by the semiconductor body pass point-wise through the holes of the scattering plate, such that a local variation of a light density on the lighting surface produces a glitter effect on the lighting surface; and wherein the output coupling structures each have an axis of rotation that extends obliquely with respect to the lighting surface, and the axis of rotation of each output coupling structure lies on a conic surface.

7. The surface light source according to claim 6, wherein the scattering plate is arranged between the radiation-emitting front side of the semiconductor body and the lighting surface.

8. The surface light source according to the claim 7, wherein the output coupling structures are formed by holes in the scattering plate, the holes being arranged in a region adjacent the semiconductor body.

9. The surface light source according to claim 6, wherein the local variation of the light density is greater than or equal to 1000 cd/m$^2$.

10. The surface light source according to claim 6, wherein the illumination region has a dimension that is greater than or equal to 300 μm.

11. The surface light source according to claim 6, wherein the variation of the light density also takes place as a function of observation angle.

12. The surface light source according to claim 6, wherein the background region has a light density that is substantially homogeneous.

* * * * *